UNITED STATES PATENT OFFICE.

CARL VON FORELL, OF BRUNSWICK, GERMANY.

ARTIFICIAL ROMAN CEMENT.

SPECIFICATION forming part of Letters Patent No. 486,707, dated November 22, 1892.

Application filed February 16, 1891. Serial No. 381,657. (No specimens.)

*To all whom it may concern:*

Be it known that I, CARL VON FORELL, a subject of the King of Prussia and German Emperor, residing at Brunswick in the Grand Duchy of Brunswick, and German Empire, have invented certain new and useful Improvements in Artificial Roman Cement, and I do hereby declare the following to be a full, clear, and exact description of the invention, such as will enable others skilled in the art to which it appertains to make and use the same.

This invention relates to artificial Roman cement; and it consists in the novel composition of ingredients mixed together in the proportions hereinafter fully described and claimed.

Roman cement has been defined at the international meeting of cement-makers as a product obtained by heating aluminious chalky marl below the temperature of fritting until the carbonic acid is driven off and then reducing it to a fine powder. All Roman cement thus made contains lime and hydraulic factors. The hydraulic factors mostly consist of the hydrate of alumina, the hydrate of silica, and the peroxide of iron, and the amount of them depends upon the raw materials used. When water is added to the Roman cement, these hydraulic factors combine with the lime and cause the cement to set. This setting is, however, imperfect on account of the incomplete combination of the lime with the hydraulic factors.

According to the present invention the Roman cement is analyzed and the amounts of lime and of the hydraulic factors are accurately determined. A chemical substance is then added to the cement, so that the mixture shall contain seventeen parts of lime to ten parts of the hydraulic factors. The chemical substance preferred for this purpose when the cement contains lime in excess is the silicate of alumina, which is a hydraulic factor, and this substance is mixed with the cement in the form of powder. The resulting composition of matter is a very superior artificial cement, and the exact proportions of the mixture are very important, as when water is added to the mixture there ensues a perfect and complete combination between the lime and the hydraulic factors, and neither the lime nor the hydraulic factors remain in an uncombined condition in the cement.

This cement is very strong, but sets with only moderate quickness. The use of silicate of alumina is preferred because of the existence of lime in the form of silicate of lime in cements which are burned at a comparatively low temperature, and because lime and silica have the property of combining with each other in various proportions.

What I claim is—

A cement consisting of a mixture of pulverized Roman cement containing an excess of lime with a predetermined quantity of silicate of alumina in the form of powder, so that the lime and the hydraulic factors in the mixture may be substantially in the proportion of seventeen to ten.

In testimony whereof I affix my signature in presence of two witnesses.

CARL VON FORELL.

Witnesses:
LYMAN A. SPALDING,
D. GURNEY SPALDING.